United States Patent
Shim et al.

(10) Patent No.: US 10,941,289 B2
(45) Date of Patent: Mar. 9, 2021

(54) GRAFT COPOLYMER, THERMOPLASTIC RESIN COMPOSITION INCLUDING GRAFT COPOLYMER, AND METHOD OF PREPARING THERMOPLASTIC RESIN COMPOSITION

(71) Applicant: LG CHEM, LTD., Seoul (KR)

(72) Inventors: Hyung Seop Shim, Daejeon (KR); Won Seok Lee, Daejeon (KR); Seok Goo Jang, Daejeon (KR); Sang Hoo Park, Daejeon (KR); Hye Jeong Ok, Daejeon (KR); Jeong Su Choi, Daejeon (KR); Keun Hoon Yoo, Daejeon (KR); Roo Da Lee, Daejeon (KR); Ho Hoon Kim, Daejeon (KR); Jong Ju Lee, Daejeon (KR)

(73) Assignee: LG Chem, LTD., Seoul (KR)

( * ) Notice: Subject to any disclaimer, the term of this patent is extended or adjusted under 35 U.S.C. 154(b) by 0 days.

(21) Appl. No.: 16/462,190

(22) PCT Filed: Sep. 4, 2018

(86) PCT No.: PCT/KR2018/010317
§ 371 (c)(1),
(2) Date: May 17, 2019

(87) PCT Pub. No.: WO2019/083153
PCT Pub. Date: May 2, 2019

(65) Prior Publication Data
US 2019/0330463 A1 Oct. 31, 2019

(30) Foreign Application Priority Data
Oct. 27, 2017 (KR) .................. 10-2017-0140743

(51) Int. Cl.
| | |
|---|---|
| C08F 279/06 | (2006.01) |
| C08J 3/22 | (2006.01) |
| C08K 3/36 | (2006.01) |
| C08K 9/06 | (2006.01) |
| C08L 33/06 | (2006.01) |
| C08L 51/04 | (2006.01) |

(52) U.S. Cl.
CPC ............ *C08L 51/04* (2013.01); *C08F 279/06* (2013.01); *C08J 3/226* (2013.01); *C08K 3/36* (2013.01); *C08K 9/06* (2013.01); *C08L 33/062* (2013.01); *C08L 2207/53* (2013.01); *C08L 2310/00* (2013.01)

(58) Field of Classification Search
CPC .... C08F 279/00; C08F 279/02; C08F 279/04; C08F 279/06; C08F 2/44; C08F 2/22; C08F 2/24; C08L 51/003; C08L 51/04; C08L 25/12; C08L 25/14; C08L 25/08; C08L 25/18; C08L 35/06; C08L 33/18; C08L 33/20; C08L 33/062
See application file for complete search history.

(56) References Cited

U.S. PATENT DOCUMENTS

| | | | |
|---|---|---|---|
| 7,019,049 B1 * | 3/2006 | Yoo ....................... | C08F 279/02 523/201 |
| 2014/0066564 A1 * | 3/2014 | Kaushik ................... | C08K 3/34 524/449 |
| 2016/0215083 A1 | 7/2016 | Jang et al. | |
| 2016/0244603 A1 * | 8/2016 | Okamoto ............. | C08G 59/063 |

FOREIGN PATENT DOCUMENTS

| | | |
|---|---|---|
| EP | 2311909 A1 | 4/2011 |
| KR | 100779159 B1 | 11/2007 |
| KR | 100799159 B1 | 11/2007 |
| KR | 1020110066902 A | 6/2011 |
| KR | 1020160054784 A | 5/2016 |
| KR | 10-2016-0061877 A | 6/2016 |
| KR | 1020170012057 A | 2/2017 |
| KR | 1020170062888 A | 6/2017 |
| KR | 1020170069456 | 6/2017 |

OTHER PUBLICATIONS

KR20170062888 machine translation (Year: 2020).*
International Search Report dated Jan. 4, 2019 for PCT/KR2018/010317.
Search Report dated Dec. 13, 2019 for Application No. EP18870078.
Decision of Registration dated Oct. 5, 2020; 3 pages.
EN abstract of KR 1020160061877 A R4 Lotte Advanced Materials Co., Ltd; 1 page.

* cited by examiner

*Primary Examiner* — James J Seidleck
*Assistant Examiner* — Jeffrey S Lenihan
(74) *Attorney, Agent, or Firm* — Morgan, Lewis & Bockius LLP

(57) ABSTRACT

A graft copolymer, a thermoplastic resin composition including the graft copolymer, and a method of preparing the thermoplastic resin composition are described herein. A graft copolymer having a shell in which silica modified with a specific compound is dispersed within a specific content range, a thermoplastic resin composition including the graft copolymer, and a method of preparing the thermoplastic resin composition are also described herein. Since silica modified with a specific compound is dispersed in the periphery of rubber particles, that is, in the shell of the graft copolymer, the dispersibility of the graft copolymer may be improved. Therefore, the graft copolymer may have transparency equal to or better than a conventional graft copolymer. In addition, compared to a resin composition having an equivalent rubber content, the thermoplastic resin composition described herein may have excellent physical properties, such as impact strength and tensile strength.

17 Claims, No Drawings

GRAFT COPOLYMER, THERMOPLASTIC RESIN COMPOSITION INCLUDING GRAFT COPOLYMER, AND METHOD OF PREPARING THERMOPLASTIC RESIN COMPOSITION

CROSS-REFERENCE TO RELATED APPLICATION

The present application is a U.S. National Stage of PCT/KR2018/010317 filed on Sep. 4, 2018, which claims priority to Korean Patent Application No. 10-2017-0140743, filed on Oct. 27, 2017 in the Korean Intellectual Property Office, the disclosures of which are incorporated herein by reference.

TECHNICAL FIELD

The present invention relates to a graft copolymer, a thermoplastic resin composition including the graft copolymer, and a method of preparing the thermoplastic resin composition. According to the present invention, since silica modified with a specific compound is dispersed in the shell of the rubber-modified graft copolymer, the graft copolymer of the present invention has high transparency and excellent impact-modifying properties such as impact strength and tensile strength.

BACKGROUND ART

In general, ABS resins are widely used in various fields because of excellent surface gloss, impact resistance, processability, and physical properties thereof. Specifically, ABS resins are used for housings of household appliances including air conditioners, vacuum cleaners, washing machines, and the like, electrical and electronic equipment, housings of office automation (OA) equipment including fax machines, computers, telephones, and the like, automobile parts, toys, leisure goods, interior decoration products, and the like.

A conventional ABS thermoplastic resin composition is prepared by mixing a rubber-modified graft copolymer prepared by copolymerizing one or two or more monomers onto a rubber latex prepared by emulsion polymerization and a styrene copolymer prepared by bulk polymerization or solution polymerization. Generally, an ABS resin prepared by emulsion polymerization has high manufacturing costs. Thus, an ABS resin composition is prepared by mixing a styrene copolymer prepared by solution polymerization with low manufacturing costs.

In addition, the refractive index difference between an ABS resin and a styrene copolymer as a matrix resin is large, and thus the ABS resin is unsuitable for products requiring transparency. For this reason, use of the ABS resin is limited. To solve such problem, a method of adding a methacrylic ester compound as a monomer has been widely used to impart transparency to an ABS resin.

In addition, in the case of ABS resins, particle size and internal structure are very important factors affecting handling of the resin, the mixing degree of the resin and additives, and the processing characteristics of products, and thus various technologies have been developed to control these factors.

A high value-added ABS resin prepared through emulsion polymerization is required to increase the advantages of high functionality and diversification. For this purpose, a technique for increasing the total solids content of latex in the existing production line to increase the production amount or for increasing rubber content in latex to reduce ABS resin content in the final ABS resin through emulsion polymerization has been proposed.

However, when solids content is increased, latex stability may be deteriorated due to increase in viscosity, and coagulated material may be formed during polymerization, so that graft reaction may not be efficiently performed. Consequently, physical properties, thermal stability, and surface gloss may be deteriorated. In addition, it may be difficult to secure stable physical properties in mass production. Therefore, there is a limit to increase total solids content or rubber content. In addition, when rubber content increases, the content of styrene-acrylonitrile having a high glass transition temperature (Tg) decreases, thereby lowering the heat resistance of a final product.

In preparation of a high value-added ABS resin, the morphology and gel content of rubber, the molecular weight of a copolymer grafted onto a rubber latex, the degree of grafting, and the composition ratio of monomers are considered to be important parameters.

Taking these facts into consideration, there has been proposed a thermoplastic resin composition in which transparent ABS resins each made of rubber latexes having different particle diameters are mixed in a specific ratio. However, the transparency of the composition is unsatisfactory. As another example, a graft resin having a gel content adjusted by introducing a crosslinkable monomer has been proposed. However, in this case, the effect of improving physical properties is insignificant. Therefore, demand for a resin composition having excellent physical properties such as mechanical strength, processability, heat resistance, and transparency has increased.

PRIOR ART DOCUMENT

[Patent Document] KR 0379318 B1

DISCLOSURE

Technical Problem

Therefore, the present invention has been made in view of the above problems, and it is one object of the present invention to provide a graft copolymer, a thermoplastic resin composition including the graft copolymer, and a method of preparing the thermoplastic resin composition. According to the present invention, since silica modified with a specific compound is dispersed in the shell of the rubber-modified graft copolymer, the dispersibility of rubber particles may be improved. Therefore, the graft copolymer of the present invention may have high transparency and excellent physical properties such as impact strength and tensile strength.

The above and other objects of the present invention may be achieved by the present invention described below.

Technical Solution

In accordance with one aspect of the present invention, provided is a graft copolymer including a conjugated diene rubber core; and a shell surrounding the rubber core and prepared by graft-polymerizing a (meth)acrylic acid alkyl ester compound, an aromatic vinyl compound, and a vinyl cyanide compound, wherein the shell includes more than 1 and less than 3 parts by weight of surface-modified silica based on 100 parts by weight of the aromatic vinyl compound.

In accordance with another aspect of the present invention, provided is a thermoplastic resin composition including (A) 20 to 80 wt % of the graft copolymer; and (B) 20 to 80 wt % of a non-graft copolymer prepared by polymerizing one or more selected from the group consisting of a (meth) acrylic acid alkyl ester compound, an aromatic vinyl compound, and a vinyl cyanide compound.

In accordance with yet another aspect of the present invention, provided is a method of preparing a thermoplastic resin composition, including a step of preparing a graft copolymer by graft-polymerizing a (meth)acrylic acid alkyl ester compound, an aromatic vinyl compound in which surface-modified silica is dispersed, and a vinyl cyanide compound onto a conjugated diene rubber; a step of preparing a non-graft copolymer by polymerizing one or more selected from the group consisting of a (meth)acrylic acid alkyl ester compound, an aromatic vinyl compound, and a vinyl cyanide compound; and a step of kneading 20 to 80 wt % of the graft copolymer and 20 to 80 wt % of the non-graft copolymer, wherein the surface-modified silica is added in an amount of more than 1 and less than 3 parts by weight based on 100 parts by weight of the aromatic vinyl compound added during graft polymerization.

Advantageous Effects

According to the present invention, silica modified with a specific compound is dispersed in the shell of the rubber-modified graft copolymer so that the periphery of rubber particles is surrounded by the silica. Therefore, the dispersibility of the rubber particles can be improved. Ultimately, the graft copolymer of the present invention can have transparency equal to or better than a conventional ABS graft copolymer, and can have excellent physical properties such as impact strength and tensile strength.

In particular, according to the present invention, compared to a conventional resin composition having an equivalent rubber content, the resin composition of the present invention can have excellent impact-modifying properties without increasing rubber content while maintaining the same level of melt index as the conventional resin composition.

In addition, in the graft copolymer according to the present invention, modified silica is dispersed in the periphery of rubber particles. Therefore, after the copolymer is prepared by an emulsion polymerization method, the flocculation state can be easily alleviated after latex is flocculated.

BEST MODE

Hereinafter, the graft copolymer of the present invention and the thermoplastic resin composition including the same will be described in detail.

The present inventors confirmed that, when surface-modified silica was dispersed in styrene within a specific content range, and then a shell was formed by graft-polymerizing methyl methacrylate, styrene on which surface-modified silica was dispersed, and acrylonitrile onto butadiene rubber, a graft copolymer having the shell in which surface-modified silica was dispersed could be prepared. In addition, the present inventors confirmed that the graft copolymer had high transparency and excellent impact-modifying properties. Based on these findings, the present invention was completed.

The graft copolymer of the present invention includes a conjugated diene rubber core; and a shell surrounding the rubber core and prepared by graft-polymerizing a (meth)acrylic acid alkyl ester compound, an aromatic vinyl compound, and a vinyl cyanide compound, wherein the shell includes more than 1 and less than 3 parts by weight of surface-modified silica based on 100 parts by weight of the aromatic vinyl compound.

When the surface-modified silica is dispersed in the shell within the above range, the dispersibility of rubber particles may be increased, thereby improving physical properties such as impact strength and tensile strength.

More preferably, the amount of the surface-modified silica dispersed in the shell may be, for example, 1.3 to 2.5 parts by weight or 1.5 to 2 parts by weight based on 100 parts by weight of the aromatic vinyl compound. Within this range, the dispersibility of rubber particles may be improved, and the flocculation state may be easily alleviated after latex is flocculated. Ultimately, it is possible to provide an effect of improving physical properties while maintaining high transparency.

For example, the surface-modified silica may include a reaction product of silica and a silane-based compound. Specifically, the surface-modified silica may include surface-modified silica as the silane-based compound. In this case, since the surface of silica is hydrophobically modified, dispersion of silica in the shell may be facilitated, and physical properties may be improved.

In addition, the weight ratio of the silica to the silane-based compound may be, for example, 1:5 to 1:30, 1:10 to 1:30, 1:10 to 1:25, 1:10 to 1:20, 1:13 to 1:25, or 1:13 to 1:18. Within this range, the dispersibility of rubber particles may be maximized, thereby improving physical properties.

For example, the silane-based compound may include a compound represented by Formula 1 below. In this case, the graft copolymer may have high transparency and excellent physical properties such as impact strength.

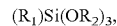  [Formula 1]

wherein $R_1$ is a linear alkyl group having 1 to 18 carbon atoms or a branched alkyl group having 3 to 18 carbon atoms, and $R_2$ is an alkyl group having 1 to 2 carbon atoms.

More preferably, in Formula 1, $R_1$ may be a linear alkyl group having 1 to 16 or 10 to 16 carbon atoms, or a branched alkyl group having 1 to 16 or 5 to 16 carbon atoms, and $R_2$ may be an alkyl group having 1 to 2 carbon atoms. More preferably, the alkyl group is a methyl group. In this case, modification of silica may be easily performed, and the dispersibility of rubber particles may be improved.

As a specific example, the silane-based compound may be one or more selected from hexadecyltrimethoxysilane, dodecyltrimethoxysilane, hexadecyltriethoxysilane, dodecyltriethoxysilane, octadecyltrimethoxysilane, and octadecyltriethoxysilane, and is most preferably hexadecyltrimethoxysilane. In this case, surface modification of silica may be easily performed, and the dispersibility of rubber particles may be improved, thereby improving the impact-modifying properties of a final resin.

For example, the surface-modified silica dispersed in the shell may have an average particle diameter of 85 to 170 nm, 90 to 160 nm, 100 to 160 nm, 100 to 140 nm, 100 to 130 nm, or 105 to 115 nm. In this case, the dispersibility of rubber particles may be excellent. Ultimately, the mechanical properties of a final resin may be improved.

For example, the average particle diameter of the surface-modified silica may be measured using intensity Gaussian distribution (Nicomp 380) according to a dynamic laser light scattering method after surface-modified silica powder is dispersed in styrene.

For example, the graft copolymer of the present invention may include 20 to 70 wt % of the conjugated diene rubber core and 30 to 80 wt % of the shell surrounding the rubber core. Within this range, the transparency and mechanical strength of the graft copolymer may be excellent.

As another example, the graft copolymer may include 30 to 60 wt % of the conjugated diene rubber core and 40 to 70 wt % of the shell surrounding the rubber core. In this case, the transparency and impact strength of the copolymer may be excellent.

As another example, the graft copolymer may include 45 to 55 wt % of the conjugated diene rubber core and 45 to 55 wt % of the shell surrounding the rubber core. Within this range, transparency and physical properties, such as impact strength and fluidity, of the graft copolymer may be excellent.

For example, the conjugated diene rubber core may have an average particle diameter of 600 to 5,000 Å, 800 to 4,000 Å, 800 to 3,500 Å, or 2,500 to 5,000 Å. Within this range, the degree of grafting may be excellent, and thus impact-modifying properties such as impact strength and tensile strength may be improved and transparency may be excellent.

For example, the average particle diameter of the conjugated diene rubber is measured using intensity Gaussian distribution (Nicomp 380) according to a dynamic laser light scattering method.

The conjugated diene rubber may be a polymer or copolymer prepared by polymerizing conjugated diene compounds having a structure in which a double bond and a single bond are alternately arranged. As a specific example, the conjugated diene rubber may be one or more selected from a butadiene polymer, a butadiene-styrene copolymer (SBR), a butadiene-acrylonitrile copolymer (NBR), an ethylene-propylene copolymer (EPDM), and derivatives thereof, and is preferably a butadiene polymer. In this case, the mechanical strength and processability of the composition may be excellent.

For example, the conjugated diene rubber may have a gel content of 70 to 97 wt % or 75 to 85 wt %. Within this range, transparency may be excellent.

For example, the conjugated diene rubber may have a swelling index of 12 to 30. Within this range, transparency may be excellent.

For example, in the present invention, when the gel content and swelling index of rubber are measured, rubber latex is flocculated using a dilute acid or metal salt, and washed and dried in a vacuum oven at 60° C. for 24 hours. Then, the resulting rubber lump is cut into small pieces with scissors. A 1 g rubber piece is placed in 100 g of toluene, and stored in a darkroom at room temperature for 48 hours so that the rubber piece is separated into sol and gel. The gel content and swelling index may be calculated using Equations 1 and 2.

Gel content (%)=[weight of insoluble matter (gel)/weight of sample]*100    [Equation 1]

Swelling index=weight of swelled gel/weight of gel    [Equation 2]

As a specific example, the graft copolymer may be a copolymer prepared by graft-polymerizing 20 to 60 wt % of a (meth)acrylic acid alkyl ester compound, 7 to 30 wt % of an aromatic vinyl compound, and 1 to 10 wt % of a vinyl cyanide compound onto 20 to 70 wt % of the conjugated diene rubber core. In this case, the transparency of the copolymer may be excellent, and the impact-modifying properties of the copolymer may be improved.

As another example, the graft copolymer may be a copolymer prepared by graft-polymerizing 20 to 50 wt % of a (meth)acrylic acid alkyl ester compound, 7 to 25 wt % of an aromatic vinyl compound, and 1 to 10 wt % of a vinyl cyanide compound onto 30 to 60 wt % of the conjugated diene rubber core. Within this range, since the refractive index difference between the rubber and the copolymer grafted thereon is small, transparency may be excellent.

As another example, the graft copolymer may be a copolymer prepared by graft-polymerizing 30 to 40 wt % of a (meth)acrylic acid alkyl ester compound, 7 to 20 wt % of an aromatic vinyl compound, and 1 to 5 wt % of a vinyl cyanide compound onto 45 to 55 wt % of the conjugated diene rubber core. In this case, in addition to transparency, the mechanical strength of the copolymer may be excellent.

For example, the (meth)acrylic acid alkyl ester compound may be a (meth)acrylic acid alkyl ester compound having an alkyl group having 1 to 20 carbon atoms. As a specific example, the (meth)acrylic acid alkyl ester compound may be one or more selected from (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester, and is preferably (meth)acrylic acid methyl ester, most preferably methyl methacrylate. In this case, the transparency of the composition may be excellent.

For example, the aromatic vinyl compound may include one or more selected from styrene, α-methylstyrene, p-methylstyrene, and vinyltoluene, and is preferably styrene. In this case, processability and impact resistance may be excellent.

For example, the vinyl cyanide compound may be one or more selected from acrylonitrile, methacrylonitrile, and ethacrylonitrile, and is preferably acrylonitrile. In this case, the impact resistance, processability, and transparency of the composition may be excellent.

For example, the graft copolymer may have a weight average molecular weight of 50,000 to 150,000 g/mol, 85,000 to 150,000 g/mol, or 90,000 to 110,000 g/mol. Within this range, fluidity may be appropriate, and thus processing may be easily performed. In addition, mechanical strength such as impact strength may be excellent.

For example, in the present invention, 1 g of resin is dissolved in tetrahydrofuran (THF), and the weight average molecular weight of the dissolved resin is measured using gel permeation chromatography (GPC). In this case, molecular weight is measured after calibration is performed using polymethyl methacrylate (PMMA) as a standard substance.

In addition, the transparency of the graft copolymer resin is determined by the refractive index of the rubber used and the refractive index of the polymer grafted onto the rubber, and the refractive index of the grafted polymer is adjusted by the mixing ratio of monomers. That is, since the refractive index of the conjugated diene rubber should be matched to the refractive index of all remaining components, the mixing ratio of monomers is very important. To impart transparency to the graft copolymer resin, the refractive index of the conjugated diene compound used as a seed or core for grafting should be similar with the refractive index of all components to be grafted onto the conjugated diene compound. Preferably, the refractive index of the conjugated diene compound and the refractive index of all components to be grafted are the same.

For example, the difference between the refractive index of the conjugated diene rubber and the refractive index of all components to be grafted thereto may be less than 0.1, less than 0.7, or less than 0.5. Within this range, transparency may be excellent.

As a specific example, the refractive index of the graft copolymer may be 1.49 to 1.55, 1.5 to 1.54, or 1.51 to 1.53. Within this range, the transparency of the composition may be excellent.

In the present invention, refractive index can be calculated as follows, unless otherwise noted:

Refractive index (RI)=ΣWti*RIi

Wti=Weight fraction (%) of each component in copolymer

RIi=Refractive index of polymer of each component in copolymer

For reference, the refractive indexes of some monomer components used in preparation of the graft copolymer of the present invention are as follows: butadiene: 1.518, methyl methacrylate: 1.49, styrene: 1.59, and acrylonitrile: 1.52.

The graft copolymer may be mixed with other copolymers to provide the thermoplastic resin composition. Hereinafter, the thermoplastic resin composition according to the present invention will be described in detail. The description of the graft copolymer is the same as that described above and, therefore, description of the graft copolymer is omitted.

For example, the thermoplastic resin composition of the present invention may include 20 to 80 wt % of the graft copolymer; and 20 to 80 wt % of a non-graft copolymer prepared by polymerizing one or more selected from the group consisting of a (meth)acrylic acid alkyl ester compound, an aromatic vinyl compound, and a vinyl cyanide compound.

The thermoplastic resin composition of the present invention includes a graft copolymer having a shell in which surface-modified silica is dispersed. Therefore, the dispersibility of the graft copolymer in the matrix resin may be improved. Ultimately, the impact-modifying properties of the composition may be greatly improved while maintaining the transparency or fluidity of the composition at a high level.

As another example, the thermoplastic resin composition may include 20 to 60 wt % of the graft copolymer and 40 to 80 wt % of a non-graft copolymer prepared by polymerizing one or more selected from the group consisting of a (meth) acrylic acid alkyl ester compound, an aromatic vinyl compound, and a vinyl cyanide compound. Within this range, the transparency, mechanical strength, and processability of the composition may be excellent.

As another example, the thermoplastic resin composition may include 25 to 45 wt % or 20 to 35 wt % of the graft copolymer and 55 to 75 wt % or 65 to 80 wt % of a non-graft copolymer prepared by polymerizing one or more selected from the group consisting of a (meth)acrylic acid alkyl ester compound, an aromatic vinyl compound, and a vinyl cyanide compound. Within this range, the physical properties, such as fluidity, transparency, and impact strength, of the composition may be excellent.

The non-graft copolymer may be prepared by polymerizing 50 to 80 wt % of a (meth)acrylic acid alkyl ester compound, 15 to 45 wt % of an aromatic vinyl compound, and 1 to 10 wt % of a vinyl cyanide compound. Within this range, since the refractive index difference between the graft copolymer and the non-graft copolymer is small, the transparency of the composition may be maximized, and the processability or impact strength of the composition may be improved.

The non-graft copolymer may be prepared by polymerizing 50 to 75 wt % of a (meth)acrylic acid alkyl ester compound, 20 to 40 wt % of an aromatic vinyl compound, and 3 to 10 wt % of a vinyl cyanide compound. In this case, the transparency, processability, and mechanical strength of the composition may be excellent.

The non-graft copolymer may be prepared by polymerizing 60 to 75 wt % of a (meth)acrylic acid alkyl ester compound, 20 to 35 wt % of an aromatic vinyl compound, and 3 to 7 wt % of a vinyl cyanide compound. Within this range, the transparency of the composition may be excellent, and the mechanical strength, such as impact strength and tensile strength, of the composition may be improved.

For example, the (meth)acrylic acid alkyl ester, aromatic vinyl, and vinyl cyanide compounds, which are monomers included in the non-graft copolymer, are the same as the compounds use in preparation of the graft copolymer. More preferably, the non-graft copolymer may be a methyl methacrylate-styrene-acrylonitrile (MSAN) copolymer, without being limited thereto. In this case, the fluidity of the composition may be appropriate, and thus processing may be easily performed. In addition, the transparency and mechanical strength of the composition may be excellent.

For example, the non-graft copolymer may have a weight average molecular weight of 50,000 to 150,000 g/mol, 85,000 to 150,000 g/mol, or 90,000 to 110,000 g/mol. Within this range, fluidity may be appropriate, and thus processing may be easily performed. In addition, mechanical strength such as impact strength may be excellent.

For example, the non-graft copolymer may have a refractive index of 1.49 to 1.55, 1.5 to 1.54, or 1.51 to 1.53. Within this range, transparency may be excellent.

In addition, the refractive index difference between the graft copolymer and the non-graft copolymer may be, for example, less than 0.01, less than 0.007, or less than 0.005. Within this range, transparency may be excellent.

For example, the resin composition may have a haze value of 0.5 to 2.0, 0.5 to 1.8, 0.5 to 1.0, or 0.8 to 1.8 as measured according to ASTM D1003. Within this range, transparency may be excellent.

For example, the resin composition may have an impact strength of 8 kgfcm/cm$^2$ or more, 8 to 25 kgfcm/cm$^2$, or 14 to 25 kgfcm/cm$^2$, and may have a tensile strength of 375 kgf/cm$^2$ or more, 375 to 600 kgf/cm$^2$, or 550 to 600 kgf/cm$^2$. Within this range, impact-modifying properties may be excellent.

For example, the resin composition may have a melt index of 5 to 30 g/10 min, 5 to 25 g/10 min, or 15 to 30 g/10 min. In this case, fluidity may be appropriate, and thus processing may be easily performed.

Optionally, the resin composition of the present invention may include one or more additives selected from UV stabilizers, fluorescent brightening agents, lubricants, chain extenders, release agents, pigments, dyes, antimicrobial agents, processing aids, inorganic fillers, glass fibers, anti-friction agents, and anti-wear agents. For example, the additives may be used in an amount of 0.01 to 5 parts by weight, 0.01 to 3 parts by weight, or 0.5 to 1 part by weight based on 100 parts by weight of the total graft copolymer and non-graft copolymer. Use of the additives within this range is preferable from the viewpoints of improving physical properties and reducing preparation costs.

Hereinafter, a method of preparing the thermoplastic resin composition will be described.

The method of preparing a thermoplastic resin composition according to the present invention includes a step of preparing a graft copolymer by graft-polymerizing a (meth)

acrylic acid alkyl ester compound, an aromatic vinyl compound in which surface-modified silica is dispersed, and a vinyl cyanide compound onto a conjugated diene rubber; a step of preparing a non-graft copolymer by polymerizing one or more selected from the group consisting of a (meth) acrylic acid alkyl ester compound, an aromatic vinyl compound, and a vinyl cyanide compound; and a step of kneading 20 to 80 wt % of the graft copolymer and 20 to 80 wt % of the non-graft copolymer, wherein the surface-modified silica is added in an amount of more than 1 and less than 3 parts by weight, 1.3 to 2.5 parts by weight, or 1.5 to 2 parts by weight based on 100 parts by weight of the aromatic vinyl compound added during graft polymerization. Within this range, the impact strength and tensile strength of the composition may be improved.

As described above, according to the method of preparing the thermoplastic resin of the present invention, surface-modified silica is dispersed within a specific content range in an aromatic vinyl compound to be added during graft polymerization, and then the aromatic vinyl compound is used in graft polymerization. Thus, the graft copolymer may be prepared to have a structure wherein surface-modified silica is dispersed in the periphery of rubber particles, that is, in the shell. In this case, the dispersibility of the graft copolymer in the matrix resin may be improved. Ultimately, impact-modifying properties may be improved.

For example, the surface-modified silica may be prepared by reacting colloidal silica with a silane-based compound. In this case, the surface of silica is hydrophobically modified, so that the compatibility between the silica and a monomer used during preparation of the graft copolymer may be excellent. In addition, the dispersibility and the physical properties, such as impact-modifying properties, of the graft copolymer may be improved.

The silane-based compound is the same as that described above, and further description thereof will be omitted.

For example, the colloidal silica may be a silica dispersion including a silica in an amount of 10 to 20 wt %, 10 to 18 wt %, or 10 to 15 wt %. In this case, it may be easier to modify the surface of silica with the silane-based compound.

As a specific example, the colloidal silica may be a silica dispersion in which silica is dispersed in an aqueous or alcoholic solvent. For example, the dispersion may have a pH of 5 to 6. In addition, the dispersion may further include a stabilizer such as ammonia.

For example, the colloidal silica may have an average particle diameter of 10 to 50 nm or 20 to 40 nm. Within this range, modification using the silane-based compound may be easily performed, and the impact-modifying properties may be maximized.

When the average particle diameter of the colloidal silica is measured, a silica dispersion is prepared by dispersing silica in an aqueous solvent at a concentration of 12 wt %, and then ammonia as a stabilizer is added to the silica dispersion. Then, the average particle diameter of the colloidal silica contained in the silica dispersion is measured using intensity Gaussian distribution (Nicomp 380) according to a dynamic laser light scattering method.

The surface-modified silica may be prepared by reacting colloidal silica with a silane-based compound, wherein the weight ratio of the colloidal silica to the silane-based compound is, for example, more than 1:1 and less than 1:3, 1:1.5 to 1:2.5, or 1:1.8 to 1:2.2. Within this range, the graft copolymer may be uniformly dispersed in the matrix resin, thereby improving the impact-modifying properties of the final composition.

When the colloidal silica is reacted with the silane-based compound, the colloidal silica and the silane-based compound may be dispersed in alcohol as a reaction solvent, and then a condensation reaction may be performed in the presence of an acid catalyst.

The graft copolymer may be prepared using a conventional emulsion polymerization method. Specifically, the prepared surface-modified silica may be dispersed within the above-described content range in an aromatic vinyl compound to be added in preparation of the graft copolymer, and then the graft copolymer may be prepared by graft-polymerizing a (meth)acrylic acid alkyl ester compound, the aromatic vinyl compound in which the surface-modified silica is dispersed, and a vinyl cyanide compound onto the conjugated diene rubber core using emulsion polymerization.

In addition, the non-graft copolymer may be prepared by polymerizing one or more selected from the group consisting of a (meth)acrylic acid alkyl ester compound, an aromatic vinyl compound, and a vinyl cyanide compound. The method of preparing the non-graft copolymer is not particularly limited, and may be suitably selected within the range usually practiced in the art. As a preferred example, the non-graft copolymer may be prepared using a bulk polymerization method, preferably a continuous bulk polymerization method in consideration of reduction in preparation costs.

The graft copolymer and non-graft copolymer prepared as described above may be subjected to kneading and extruding steps to provide the thermoplastic resin composition.

For example, during kneading, the graft copolymer may be included in an amount of 20 to 80 wt %, 20 to 60 wt %, 25 to 45 wt %, or 20 to 35 wt %, and the non-graft copolymer may be included in an amount of 20 to 80 wt %, 40 to 80 wt %, 55 to 75 wt %, or 65 to 80 wt %. Within this range, the transparency, processability, and impact-modifying properties of the final composition may be excellent.

The method of performing kneading and extruding is not particularly limited, and may be appropriately selected within the range usually practiced in the art. Preferably, the kneading and extruding may be performed at 200 to 350 rpm and at 180 to 250° C.

Specifically, the composition is uniformly dispersed and extruded using a single-screw extruder, a twin-screw extruder, or a Banbury mixer. Then, the extruded composition is passed through a water bath and cut to provide a resin composition in the form of, for example, a pellet.

For example, the kneading and extruding may be performed using a single-screw extruder, a twin-screw extruder, or a Banbury mixer. The composition may be uniformly mixed and extruded by the kneading and extruding to provide a thermoplastic resin composition in the form of, for example, a pellet.

In addition, the above-described additives such as lubricants and antioxidants may be added when kneading is performed.

In addition, the thermoplastic resin composition obtained by the above-described preparation method may be prepared as a molded article by a molding process such as injection molding.

In describing the graft copolymer, the thermoplastic resin composition, and the method of preparing the thermoplastic resin composition according to the present invention, the constituent elements not explicitly described are not particularly limited when the constituent elements are within the range of ordinary practice in the art, and may be appropriately selected and used.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

The materials used in Examples and Comparative Examples were prepared as follows.

Preparation Example A-1: Preparation of Styrene in which Surface-Modified Silica is Dispersed 1 part by weight of colloidal silica (silica content: 12 wt %, average particle diameter: 36.3 nm) and 2 parts by weight of hexadecyltrimethoxysilane were dispersed in a mixed solvent of propylene glycol/methanol, and then hydrochloric acid was added dropwise thereto to lower pH to the range of 2 to 3. Then, reaction was performed while stirring the mixture for 3 hours, followed by aging, washing, and drying to obtain hexadecyltrimethoxysilane-modified silica powder. 2 parts by weight of the obtained powder was added to 100 parts by weight of styrene, and the mixture was stirred at high speed to obtain styrene in which surface-modified silica was dispersed. In this case, it was confirmed that the average particle diameter of the surface-modified silica was 110 nm.

Preparation Example A-2: Preparation of Styrene in which Unmodified Silica is Dispersed Unmodified silica powder was obtained in the same manner as in Preparation Example A-1, except that hexadecyltrimethoxysilane was not used and only the same colloidal silica was added to a mixed solvent of propylene glycol/methanol. Then, 2 parts by weight of the obtained powder was added to 100 parts by weight of styrene, and the mixture was stirred at high speed to obtain styrene in which unmodified silica is dispersed. In this case, it was confirmed that the average particle diameter of the dispersed silica was 40 nm.

Preparation Example A-3: Preparation of Styrene in which Surface-Modified Silica is Dispersed Styrene in which surface-modified silica was dispersed was prepared in the same manner as in Preparation Example A-1, except that the feed amount of hexadecyltrimethoxysilane was 1 part by weight. In this case, it was confirmed that the average particle diameter of the modified silica was 80 nm.

Preparation Example A-4: Preparation of Styrene in which Surface-Modified Silica is Dispersed Styrene in which surface-modified silica was dispersed was prepared in the same manner as in Preparation Example A-1, except that the feed amount of hexadecyltrimethoxysilane was 3 parts by weight. In this case, it was confirmed that the average particle diameter of the modified silica was 180 nm.

Preparation Example A-5: Preparation of Styrene in which Surface-Modified Silica is Dispersed Styrene in which surface-modified silica was dispersed was prepared in the same manner as in Preparation Example A-1, except that 0.5 parts by weight of the surface-modified silica powder was dispersed in 100 parts by weight of styrene. In this case, it was confirmed that the average particle diameter of the modified silica was 110 nm.

Preparation Example A-6: Preparation of Styrene in which Surface-Modified Silica is Dispersed Styrene in which surface-modified silica was dispersed was prepared in the same manner as in Preparation Example A-1, except that 1.5 parts by weight of the surface-modified silica powder was dispersed in 100 parts by weight of styrene. In this case, it was confirmed that the average particle diameter of the modified silica was 90 nm.

Preparation Example A-7: Preparation of Styrene in which Surface-Modified Silica is Dispersed Styrene in which surface-modified silica was dispersed was prepared in the same manner as in Preparation Example A-1, except that 2.5 parts by weight of the surface-modified silica powder was dispersed in 100 parts by weight of styrene. In this case, it was confirmed that the average particle diameter of the modified silica was 160 nm.

Preparation Example B-1: Preparation of Graft Copolymer 50 parts by weight of a butadiene rubber latex having an average particle diameter of 3,000 Å was prepared, and 100 parts by weight of deionized water, 0.35 parts by weight of potassium oleate, 0.2 parts by weight of acetic acid, 34 parts by weight of methyl methacrylate, 13 parts by weight of the styrene of Preparation Example A-1, 3 parts by weight of acrylonitrile, 0.3 parts by weight of tert-dodecylmercaptan (TDDM) as a molecular weight regulator, 0.048 parts by weight of sodium pyrophosphate, 0.012 parts by weight of dextrose, 0.001 part by weight of ferrous sulfide, and 0.04 parts by weight of cumene hydroperoxide were sequentially added to the butadiene rubber latex for 4 hours at 75° C., and then reaction was conducted. After reaction, temperature was raised to 78° C., aging was performed for 1 hour, and reaction was terminated. Then, the latex was flocculated using an aqueous solution of calcium chloride, followed by washing and drying to obtain powder. In this case, the refractive index of the obtained rubber-modified graft copolymer was 1.516.

Preparation Example B-2: Preparation of Graft Copolymer

A graft copolymer was prepared in the same manner as in Preparation Example B-1, except that the styrene of Preparation Example A-2 was used instead of the styrene of Preparation Example A-1.

Preparation Example B-3: Preparation of Graft Copolymer

A graft copolymer was prepared in the same manner as in Preparation Example B-1, except that the styrene of Preparation Example A-3 was used instead of the styrene of Preparation Example A-1.

Preparation Example B-4: Preparation of Graft Copolymer

A graft copolymer was prepared in the same manner as in Preparation Example B-1, except that the styrene of Preparation Example A-4 was used instead of the styrene of Preparation Example A-1.

Preparation Example B-5: Preparation of Graft Copolymer

A graft copolymer was prepared in the same manner as in Preparation Example B-1, except that styrene was used instead of the styrene of Preparation Example A-1.

Preparation Example B-6: Preparation of Graft Copolymer 50 parts by weight of a butadiene rubber latex having an average particle diameter of 1,000 Å was prepared, and 100 parts by weight of deionized water, 0.35 parts by weight of potassium oleate, 0.2 parts by weight of acetic acid, 34 parts by weight of methyl methacrylate, 13 parts by weight of the styrene of Preparation Example A-1, 3 parts by weight of acrylonitrile, 0.3 parts by weight of tert-dodecylmercaptan (TDDM) as a molecular weight regulator, 0.048 parts by weight of sodium pyrophosphate, 0.012 parts by weight of dextrose, 0.001 part by weight of ferrous sulfide, and 0.04 parts by weight of cumene hydroperoxide were sequentially added to the butadiene rubber latex for 4 hour at 75° C., and then reaction was conducted. After reaction, temperature was raised to 78° C., aging was performed for 1 hour, and reaction was terminated. Then, the latex was flocculated using an aqueous solution of calcium chloride, followed by washing and drying to obtain powder. In this case, the refractive index of the obtained rubber-modified graft copolymer was 1.516.

Preparation Example B-7: Preparation of Graft Copolymer

A graft copolymer was prepared in the same manner as in Preparation Example B-6, except that styrene was used instead of the styrene of Preparation Example A-1.

Preparation Example B-8: Preparation of Graft Copolymer

A graft copolymer was prepared in the same manner as in Preparation Example B-1, except that the styrene of Preparation Example A-6 was used instead of the styrene of Preparation Example A-1.

Preparation Example B-9: Preparation of Graft Copolymer

A graft copolymer was prepared in the same manner as in Preparation Example B-1, except that the styrene of Preparation Example A-7 was used instead of the styrene of Preparation Example A-1.

Preparation Example C-1: Preparation of Non-Graft Copolymer 70.4 parts by weight of methyl methacrylate, 24.6 parts by weight of styrene, 5 parts by weight of acrylonitrile, and 0.15 parts by weight of tert-dodecylmercaptan as a molecular weight regulator were added to 30 parts by weight of toluene as a solvent, and the mixture was continuously added to a reactor so that the average reaction time was 3 hours. At this time, reaction was performed at a reaction temperature of 148° C. The polymerization solution discharged from the reactor was heated in a preheating tank, and unreacted monomers were volatilized and removed in a volatilization tank. Then, the copolymer resin was pelletized using a polymer transfer pump extrusion machine while maintaining temperature at 210° C. In this case, the weight average molecular weight of the prepared copolymer resin was 120,000 g/mol, and the refractive index thereof was 1.516.

Preparation Example C-2: Preparation of Non-Graft Copolymer

A non-graft copolymer was prepared in the same manner as in Preparation Example C-1, except that the styrene of Preparation Example A-5 was used instead of styrene.

EXAMPLES

Examples 1 to 3 and Comparative Examples 1 to 5

The graft copolymers and non-graft copolymers prepared in the preparation examples were mixed in the respective contents shown in Table 1, and 1 part by weight of a lubricant and 0.4 parts by weight of an antioxidant were added to the mixture. Then, the mixture was pelletized at a cylinder temperature of 220° C. using a twin-screw extrusion kneader, and the pellets were injection-molded to prepare specimens for measuring physical properties.

TABLE 1

| Classification | Graft copolymer (types of aromatic vinyl compounds used in preparation of copolymer) | | | | | | | Non-graft copolymer | |
| --- | --- | --- | --- | --- | --- | --- | --- | --- | --- |
| | B-1 (A-1) | B-2 (A-2) | B-3 (A-3) | B-4 (A-4) | B-5 (styrene) | B-8 (A-6) | B-9 (A-7) | C-1 | C-2 (A-5) |
| Example 1 | 30 | — | — | — | — | — | — | 70 | — |
| Example 2 | — | — | — | — | — | 30 | — | 70 | — |
| Example 3 | — | — | — | — | — | — | 30 | 70 | — |
| Comparative Example 1 | — | 30 | — | — | — | — | — | 70 | — |
| Comparative Example 2 | — | — | 30 | — | — | — | — | 70 | — |

TABLE 1-continued

| | Graft copolymer (types of aromatic vinyl compounds used in preparation of copolymer) | | | | | | | Non-graft copolymer | |
|---|---|---|---|---|---|---|---|---|---|
| Classification | B-1 (A-1) | B-2 (A-2) | B-3 (A-3) | B-4 (A-4) | B-5 (styrene) | B-8 (A-6) | B-9 (A-7) | C-1 | C-2 (A-5) |
| Comparative Example 3 | — | — | — | 30 | — | — | — | 70 | — |
| Comparative Example 4 | — | — | — | — | 30 | — | — | 70 | — |
| Comparative Example 5 | — | — | — | — | 30 | — | — | — | 70 |

In Table 1, the content of each of the graft copolymers and the non-graft copolymers is given in % by weight based on the total weight thereof.

Test Examples

The properties of specimens prepared in the examples and comparative examples were measured by methods below, and the results are shown in Table 2.
Transmittance (Tt) and transparency (Haze): The haze value and transmittance (Tt, %) of each of 3 mm thick sheets were measured according to ASTM D1003.
Impact strength (Notched Izod impact strength, kgfcm/cm$^2$): Impact strength was measured using ¼" scale specimens according to standard measurement ASTM D256.
Tensile strength (kgf/cm$^2$): Tensile strength was measured according to ASTM D638.
Melt index (g/10 min): Melt index was measured under the conditions of 220° C. and 10 kg according to standard measurement ASTM D1238.

TABLE 2

| Classification | Transmittance (Tt, %) | Transparency (Haze) | Impact strength (kgfcm/cm$^2$) | Tensile strength (kgf/cm$^2$) | Melt index (g/10 min) |
|---|---|---|---|---|---|
| Example 1 | 90.9 | 1.8 | 14.3 | 581 | 24.0 |
| Example 2 | 90.7 | 1.9 | 13.4 | 570 | 24.0 |
| Example 3 | 90.8 | 1.8 | 13.8 | 575 | 24.1 |
| Comparative Example 1 | 90.6 | 2.2 | 11.0 | 527 | 23.7 |
| Comparative Example 2 | 90.7 | 1.9 | 11.9 | 547 | 24.0 |
| Comparative Example 3 | 90.7 | 1.7 | 8.3 | 476 | 24.3 |
| Comparative Example 4 | 90.6 | 1.8 | 10.4 | 534 | 24.4 |
| Comparative Example 5 | 90.5 | 1.9 | 10.6 | 532 | 24.1 |

As shown in Table 2, in the case of Examples 1 to 3, in which graft copolymers having a shell in which surface-modified silica is dispersed are prepared according to the present invention, compared with Comparative Example 4 without surface-modified silica, it can be seen that impact strength and tensile strength are excellent while transparency and fluidity are maintained at the same level.

On the other hand, in the case of Comparative Example 1 in which a graft copolymer having a shell in which surface-unmodified silica is dispersed is prepared, compared with Comparative Example 4, it can be seen that impact strength slightly increases but tensile strength and transparency are lowered, and physical properties are not remarkably improved.

In addition, when the surface of silica is modified, in the case of a graft copolymer having a shell in which surface-modified silica prepared using a small amount of a silane-based compound is dispersed (Comparative Example 2), it can be confirmed that dramatic improvement in physical properties is not exhibited, similarly to Comparative Example 1.

Conversely, in the case of a graft copolymer having a shell in which surface-modified silica prepared using an excess of a silane-based compound is dispersed (Comparative Example 3), it can be confirmed that impact strength and tensile strength are remarkably lowered as compared with the examples.

In addition, when a non-graft copolymer is prepared using surface-modified silica (Comparative Example 5), it can be confirmed that impact strength and tensile strength are not improved even though the same surface-modified silica as in Example 1 is used.

That is, taken together, when surface-modified silica is added during preparation of a graft copolymer and is dispersed in a shell within a specific content range, physical properties such as impact strength and tensile strength may be improved. In this case, it can be confirmed that, depending on the weight ratio between silica and a silane-based compound used in preparation of surface-modified silica, the average particle diameter of the surface-modified silica is changed, and the average particle diameter of the modified silica has an effect on impact-modifying properties.

In addition, these experimental results suggest that modified silica is dispersed in the periphery of the rubber particles (that is, in the shell) of a graft copolymer, so that the dispersibility of the graft copolymer in a matrix resin is improved, thereby improving the above-described physical properties.

Example 4 and Comparative Example 6

Specimens for measurement of physical properties were prepared in the same manner as described above, except that the graft copolymers and non-graft copolymers prepared in the examples were respectively mixed in the amounts shown in Table 3.

In addition, the properties of the specimens prepared in Example 4 and Comparative Example 6 were measured in the same manner as described above, and the results are shown in Table 4.

TABLE 3

| Classification | Graft copolymer (types of aromatic vinyl compounds used in preparation of copolymer) | | | | | | | Non-graft copolymer | |
|---|---|---|---|---|---|---|---|---|---|
| | B-1 (A-1) | B-2 (A-2) | B-3 (A-3) | B-4 (A-4) | B-5 (styrene) | B-6 (A-1) | B-7 (styrene | C-1 | C-2 (A-5) |
| Example 4 | — | — | — | — | — | 60 | — | 40 | — |
| Comparative example 6 | — | — | — | — | — | — | 60 | 40 | — |

In Table 3, the content of each of the graft copolymers and the non-graft copolymers is given in % by weight based on the total weight thereof.

TABLE 4

| Classification | Transmittance (Tt, %) | Transparency (Haze) | Impact strength (kgfcm/cm²) | Tensile strength (kgf/cm²) | Melt index (g/10 min) |
|---|---|---|---|---|---|
| Example 4 | 91.5 | 0.8 | 8.6 | 375 | 5.4 |
| Comparative Example 6 | 91.3 | 0.8 | 5.7 | 349 | 5.9 |

Referring to Table 4, when a graft copolymer is prepared by grafting methyl methacrylate, styrene, and acrylonitrile onto a small diameter rubber having an average particle diameter of 1,000 Å, even when surface-modified silica is added according to the present invention (Example 4), compared to a case in which surface-modified silica is not included (Comparative Example 4), it can be confirmed that impact strength and tensile strength are significantly improved while transparency and melt index are maintained at the same level.

The invention claimed is:

1. A graft copolymer, comprising:
   a conjugated diene rubber core; and
   a shell surrounding the rubber core and prepared by graft-polymerizing a (meth)acrylic acid alkyl ester compound, an aromatic vinyl compound, and a vinyl cyanide compound,
   wherein the shell comprises more than 1 and less than 3 parts by weight of surface-modified silica based on 100 parts by weight of the aromatic vinyl compound.

2. The graft copolymer according to claim 1, wherein the surface-modified silica comprises a reaction product of silica and a silane-based compound.

3. The graft copolymer according to claim 2, wherein the silane-based compound is a compound represented by Formula 1 below:

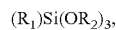

$(R_1)Si(OR_2)_3$, [Formula 1]

wherein $R_1$ is a linear alkyl group having 1 to 18 carbon atoms or a branched alkyl group having 3 to 18 carbon atoms, and $R_2$ is an alkyl group having 1 to 2 carbon atoms.

4. The graft copolymer according to claim 2, wherein a weight ratio of the silica to the silane-based compound is 1:5 to 1:30.

5. The graft copolymer according to claim 1, wherein the surface-modified silica is dispersed in the shell, and has an average particle diameter of 85 to 170 nm.

6. The graft copolymer according to claim 1, wherein the graft copolymer comprises 20 to 70 wt % of the conjugated diene rubber core and 30 to 80 wt % of the shell surrounding the rubber core.

7. The graft copolymer according to claim 6, wherein the graft copolymer comprises the shell of the graft copolymer prepared by graft-polymerizing 20 to 60 wt % of a (meth)acrylic acid alkyl ester compound, 7 to 30 wt % of an aromatic vinyl compound, and 1 to 10 wt % of a vinyl cyanide compound onto 20 to 70 wt % of the conjugated diene rubber core, wherein the wt % is relative to the weight of the graft copolymer.

8. The graft copolymer according to claim 1, wherein the conjugated diene rubber core has an average particle diameter of 600 to 5000 Å.

9. A thermoplastic resin composition, comprising:
   (A) 20 to 80 wt % of the graft copolymer according to claim 1; and
   (B) 20 to 80 wt % of a non-graft copolymer prepared by polymerizing one or more selected from the group consisting of a (meth)acrylic acid alkyl ester compound, an aromatic vinyl compound, and a vinyl cyanide compound.

10. The thermoplastic resin composition according to claim 9, wherein the non-graft copolymer (B) is prepared by polymerizing 50 to 80 wt % of a (meth)acrylic acid alkyl ester compound, 15 to 45 wt % of an aromatic vinyl compound, and 1 to 10 wt % of a vinyl cyanide compound.

11. The thermoplastic resin composition according to claim 9, wherein each of the graft copolymer (A) and the non-graft copolymer (B) has a weight average molecular weight of 50,000 to 150,000 g/mol.

12. The thermoplastic resin composition according to claim 9, wherein a refractive index difference between the graft copolymer (A) and the non-graft copolymer (B) is less than 0.01.

13. The thermoplastic resin composition according to claim 9, wherein the resin composition has a haze value of 0.5 to 2.0 as measured according to ASTM D1003.

14. A method of preparing a thermoplastic resin composition, comprising:
   a step of preparing a graft copolymer by graft-polymerizing a (meth)acrylic acid alkyl ester compound, an aromatic vinyl compound in which surface-modified silica is dispersed, and a vinyl cyanide compound onto a conjugated diene rubber;
   a step of preparing a non-graft copolymer by polymerizing one or more selected from the group consisting of a (meth)acrylic acid alkyl ester compound, an aromatic vinyl compound, and a vinyl cyanide compound; and
   a step of kneading 20 to 80 wt % of the graft copolymer and 20 to 80 wt % of the non-graft copolymer,
   wherein the surface-modified silica is added in an amount of more than 1 and less than 3 parts by weight based on 100 parts by weight of the aromatic vinyl compound added during graft polymerization.

15. The method according to claim 14, wherein the surface-modified silica is prepared by reacting colloidal silica with a silane-based compound, wherein a weight ratio of the colloidal silica to the silane-based compound is more than 1:1 and less than 1:3.

16. The method according to claim 15, wherein the colloidal silica comprises 10 to 20 wt % of silica.

17. The method according to claim 16, wherein the colloidal silica has an average particle diameter of 10 to 50 nm.

\* \* \* \* \*